United States Patent
Sohn

(10) Patent No.: US 12,284,299 B2
(45) Date of Patent: Apr. 22, 2025

(54) ELECTRONIC DEVICE HOUSING WITH INSERT MOLDED FEATURES AND METHODS OF CONSTRUCTING THE SAME

(71) Applicant: Motorola Mobility LLC, Chicago, IL (US)

(72) Inventor: Byoungkwan Sohn, Arlington Heights, IL (US)

(73) Assignee: Motorola Mobility LLC, Chicago, IL (US)

( * ) Notice: Subject to any disclaimer, the term of this patent is extended or adjusted under 35 U.S.C. 154(b) by 731 days.

(21) Appl. No.: 15/461,286

(22) Filed: Mar. 16, 2017

(65) Prior Publication Data
US 2018/0270963 A1    Sep. 20, 2018

(51) Int. Cl.
| | |
|---|---|
| *G06F 1/16* | (2006.01) |
| *H04M 1/02* | (2006.01) |
| *B29C 45/14* | (2006.01) |
| *B29K 69/00* | (2006.01) |
| *B29L 31/34* | (2006.01) |

(52) U.S. Cl.
CPC ........ *H04M 1/0202* (2013.01); *G06F 1/1698* (2013.01); *B29C 45/14639* (2013.01); *B29K 2069/00* (2013.01); *B29L 2031/3481* (2013.01)

(58) Field of Classification Search
CPC .......... H05K 5/0217; B29L 2031/3481; B29K 2069/00
See application file for complete search history.

(56) References Cited

U.S. PATENT DOCUMENTS

| | | | | |
|---|---|---|---|---|
| 4,823,234 A | * | 4/1989 | Konishi | H01L 21/56 174/548 |
| 4,980,694 A | * | 12/1990 | Hines | H01Q 1/243 343/700 MS |
| 5,103,292 A | * | 4/1992 | Mahulikar | H01L 23/04 257/697 |
| 5,797,084 A | * | 8/1998 | Tsuru | H01Q 1/243 343/751 |
| 5,952,713 A | * | 9/1999 | Takahira | G06K 19/07779 257/679 |
| 5,962,810 A | * | 10/1999 | Glenn | H01L 31/0203 174/524 |
| 6,072,122 A | * | 6/2000 | Hosoya | H01L 23/24 174/524 |

(Continued)

OTHER PUBLICATIONS

"Pem Fasteners", PennEngineering; Unknown publication date but prior to filing of present application; viewed online Dec. 3, 2019 at https://www.pemnet.com/fastening-products/pem-self-clinching-fasteners-new/.

(Continued)

*Primary Examiner* — Imani N Hayman
*Assistant Examiner* — Theron S Milliser
(74) *Attorney, Agent, or Firm* — Philip H. Burrus, IV

(57) ABSTRACT

A component for an electronic device include a housing and a plastic substrate. The plastic substrate is disposed in, and adjacent to, the housing, A thermoplastic overlayer is insert molded into the housing. The plastic substrate is disposed between the housing and the thermoplastic overlayer after the insert molding. The plastic substrate and the thermoplastic overlayer can share at least one common incision penetrating the thermoplastic overlayer and at least partially penetrating the plastic substrate.

16 Claims, 8 Drawing Sheets

(56) References Cited

U.S. PATENT DOCUMENTS

| | | | | |
|---|---|---|---|---|
| 6,075,500 | A * | 6/2000 | Kurz | H01Q 1/242 343/895 |
| 6,433,728 | B1 * | 8/2002 | Krupp | G07C 9/00944 341/173 |
| 6,630,906 | B2 * | 10/2003 | Tomomatsu | H01Q 1/362 343/700 MS |
| 6,642,907 | B2 * | 11/2003 | Hamada | H01Q 9/0421 343/873 |
| 6,917,345 | B2 * | 7/2005 | Hamada | B29C 45/1671 343/895 |
| 6,946,994 | B2 * | 9/2005 | Imaizumi | H01Q 1/242 343/700 MS |
| 6,962,829 | B2 * | 11/2005 | Glenn | H01L 21/561 438/33 |
| 7,166,812 | B2 * | 1/2007 | White | B29C 45/14639 200/293 |
| 8,289,216 | B2 * | 10/2012 | Cho | B29C 45/1671 343/702 |
| 8,442,603 | B2 * | 5/2013 | Hong | B29C 33/16 455/575.7 |
| 8,957,829 | B2 * | 2/2015 | Zhang | H01Q 1/40 343/873 |
| 9,107,295 | B2 * | 8/2015 | Lassmann | H05K 1/0201 |
| 9,496,602 | B2 * | 11/2016 | Kasar | H05K 3/284 |
| 9,736,944 | B2 * | 8/2017 | Hikino | H05K 1/119 |
| 9,812,768 | B2 * | 11/2017 | Youm | H01Q 1/40 |
| 9,826,630 | B2 * | 11/2017 | Vincent | H05K 1/0218 |
| 10,068,832 | B2 * | 9/2018 | Han | H05K 1/0216 |
| 10,177,095 | B2 * | 1/2019 | Han | H01L 24/82 |
| 10,201,072 | B2 * | 2/2019 | Kuk | H05K 9/0026 |
| 10,411,329 | B2 * | 9/2019 | Cardinali | H01Q 9/42 |
| 10,440,819 | B2 * | 10/2019 | Vincent | H01L 24/97 |
| 10,477,687 | B2 * | 11/2019 | Mun | H01L 23/552 |
| 10,485,118 | B2 * | 11/2019 | Elolampi | H05K 3/284 |
| 10,497,650 | B2 * | 12/2019 | Kim | H01L 21/4885 |
| 10,531,599 | B2 * | 1/2020 | Mun | H05K 1/181 |
| 10,566,293 | B2 * | 2/2020 | Kuk | H05K 3/284 |
| 10,624,248 | B2 * | 4/2020 | Kim | H05K 9/0088 |
| 10,707,171 | B2 * | 7/2020 | Yoshihiro | H01L 23/552 |
| 10,993,327 | B2 * | 4/2021 | Gao | H01L 21/6835 |
| 2002/0093457 | A1 * | 7/2002 | Hamada | H01Q 9/0421 343/702 |
| 2005/0136852 | A1 * | 6/2005 | Nakagawa | H04B 1/034 455/90.3 |
| 2009/0243942 | A1 * | 10/2009 | Autti | H01Q 11/08 343/702 |
| 2010/0127396 | A1 * | 5/2010 | Tang | H01L 23/66 257/773 |
| 2010/0234082 | A1 * | 9/2010 | Hong | H04B 1/3833 455/575.7 |
| 2011/0037169 | A1 * | 2/2011 | Pagaila | H01L 24/97 257/737 |
| 2011/0090632 | A1 * | 4/2011 | Raff | G06F 1/1616 361/679.27 |
| 2011/0127654 | A1 * | 6/2011 | Weng | H01L 24/19 257/E23.114 |
| 2011/0128712 | A1 * | 6/2011 | Prest | H01L 23/3107 29/841 |
| 2013/0076573 | A1 * | 3/2013 | Rappoport | H01Q 1/243 343/702 |
| 2013/0222193 | A1 * | 8/2013 | Hong | B29C 45/14065 343/702 |
| 2013/0318766 | A1 * | 12/2013 | Kiple | B23P 11/00 29/428 |
| 2014/0063768 | A1 * | 3/2014 | Tanaka | H01L 23/3121 29/830 |
| 2014/0146448 | A1 * | 5/2014 | Yoo | B29C 45/14811 361/679.01 |
| 2015/0016066 | A1 * | 1/2015 | Shimamura | H01L 21/561 361/728 |
| 2015/0043189 | A1 * | 2/2015 | Kitazaki | H05K 1/0216 361/816 |
| 2015/0313003 | A1 * | 10/2015 | Kasar | H01Q 1/243 174/541 |
| 2016/0029492 | A1 * | 1/2016 | Hikino | B29C 45/14 174/251 |
| 2016/0073496 | A1 * | 3/2016 | Vincent | H05K 1/0218 361/772 |
| 2016/0079663 | A1 * | 3/2016 | Youm | H01Q 1/40 343/702 |
| 2016/0157392 | A1 * | 6/2016 | Happoya | G06F 1/1656 361/816 |
| 2016/0233573 | A1 * | 8/2016 | Son | H04M 1/0202 |
| 2016/0262292 | A1 * | 9/2016 | Kuk | H05K 3/284 |
| 2017/0207524 | A1 * | 7/2017 | Cardinali | H05K 3/284 |
| 2017/0223846 | A1 * | 8/2017 | Elolampi | H05K 3/284 |
| 2017/0295679 | A1 * | 10/2017 | Kim | H05K 5/065 |
| 2018/0063948 | A1 * | 3/2018 | Vincent | H05K 1/115 |
| 2018/0116078 | A1 * | 4/2018 | Mun | H05K 9/0039 |
| 2018/0337135 | A1 * | 11/2018 | Yoshihiro | H01L 25/0655 |
| 2020/0281082 | A1 * | 9/2020 | Elolampi | H05K 3/32 |
| 2020/0286834 | A1 * | 9/2020 | Yoshihiro | H01L 24/19 |
| 2020/0413544 | A1 * | 12/2020 | Gao | H01L 23/66 |

OTHER PUBLICATIONS

Leonard, Shana , "Process Integrates Complex 3-D Parts into a Single Device", Published Jan. 24, 2012 online at Qmed; Viewed Dec. 3, 2019 at https://www.mddionline.com/process-integrates-complex-3-d-parts-single-device.

* cited by examiner

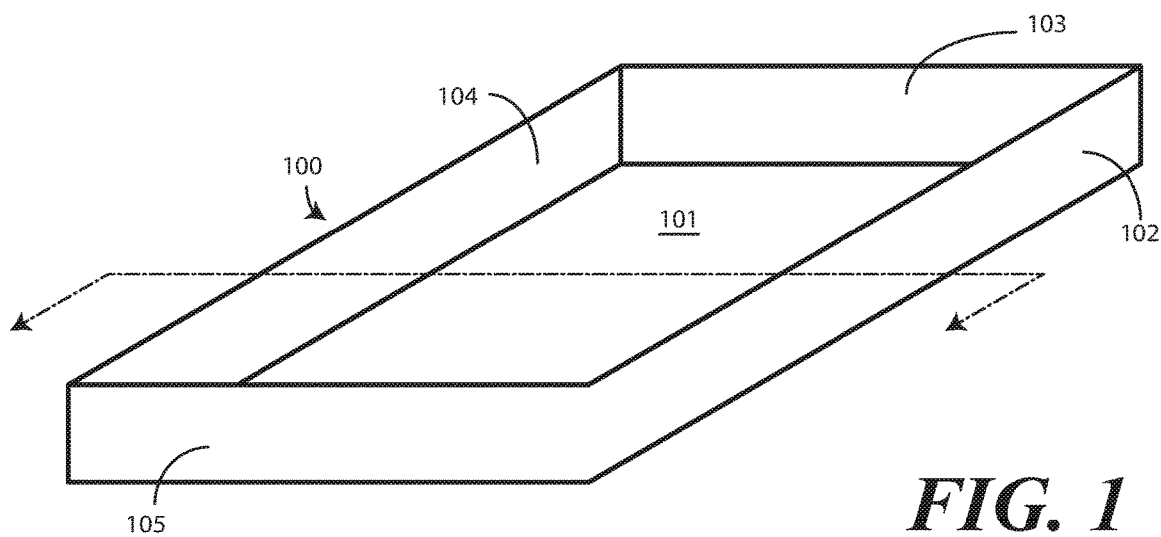
FIG. 1
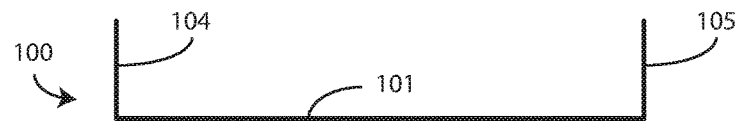
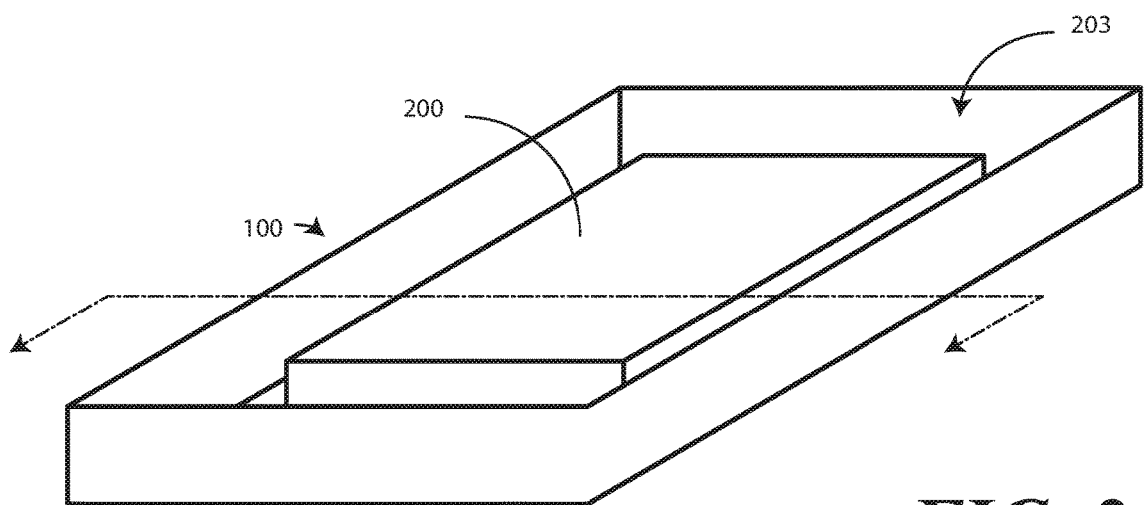
FIG. 2
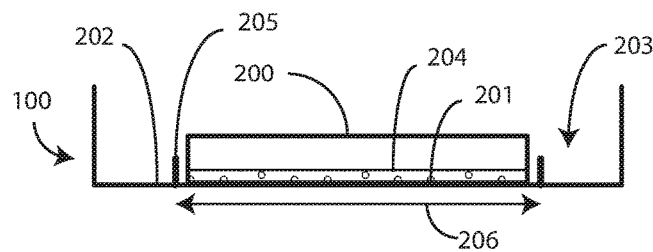

ELECTRONIC DEVICE HOUSING WITH INSERT MOLDED FEATURES AND METHODS OF CONSTRUCTING THE SAME

BACKGROUND

Technical Field

This disclosure relates generally to housings for devices, and more particularly to housings for electronic devices.

Background Art

Many items include a protective outer housing. For example, many portable electronic devices include an outer housing that is manufactured from plastic, metal, or other materials. As these electronic devices constitute powerful computing systems, the housing serves as a protective cover. Additionally, the housing can provide design and aesthetic benefits. Materials such as polished aluminum, brushed steel, and carbon fiber can add design aesthetics in addition to protecting internal components from damage.

As technology develops, users frequently demand for lighter and thinner devices. At the same time, users continually demand increased functionality, which sometimes requires additional, or larger components. When users desire to have longer battery life, for example, this may require a battery of larger volume. When users want to have Global Positioning System navigation in addition to the ability to make cellular telephone calls, another antenna is required, and so forth. This results in manufacturers striving to provide thinner housings without compromising mechanical protection and integrity, while also accommodating additional components and features. There is thus a need for an improved housing construct suitable for use with electronic devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 1 illustrates a perspective and sectional view of one explanatory housing in accordance with one or more embodiments of the disclosure.

FIG. 2 illustrates a perspective and sectional view of one explanatory housing assembly in accordance with one or more embodiments of the disclosure.

Figure 3:
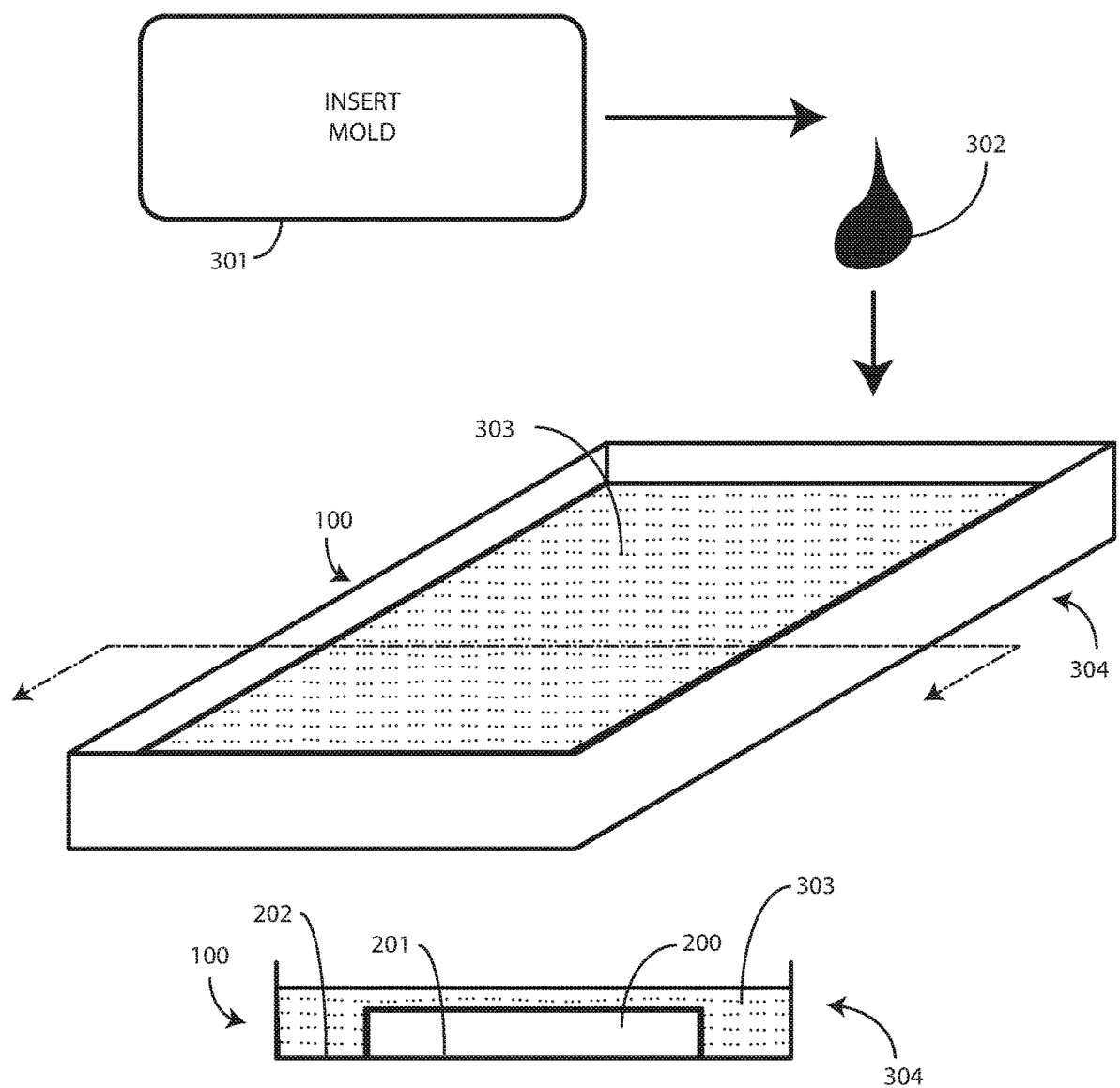
FIG. 3 illustrates one or more method steps for creating a housing assembly and a perspective and sectional view of another explanatory housing assembly in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a component for an electronic device. In one embodiment, the component can be used as a housing for an electronic device. In one or more embodiments, the component includes a housing member that is manufactured from metal. For example, in one embodiment the housing member is manufactured from aluminum. Other materials can be used as well, as noted below.

In one or more embodiments, a plastic substrate is disposed within, and adjacent to, the housing member. The plastic substrate can be held in place with mechanical features formed along the housing, a layer of adhesive, or other techniques.

Once the plastic substrate is positioned within the housing member, this sub-assembly is processed with an insert molding process. In one embodiment, a thermoplastic overlayer is insert molded into the housing atop the plastic substrate. This results in the plastic substrate being disposed between the housing and the thermoplastic overlayer. The thermoplastic overlayer can envelop the plastic substrate in one embodiment. In other embodiments, the thermoplastic overlayer can be disposed only atop the plastic substrate, atop the plastic substrate and about one side of the plastic substrate, or atop the plastic substrate and about multiple sides of the plastic substrate.

Once the insert molding process is complete, one or more post processing steps can be applied to the assembly. In one or more embodiments, the one or more post processing steps comprise one or more of cutting, etching, making incisions, or otherwise removing at least a portion of the thermoplastic overlayer and a portion of the plastic substrate. Illustrating by example, in one embodiment a Computer Numeric Control (CNC) process or machine can cause one or more incisions to be made into the thermoplastic overlayer and at least a portion of the plastic substrate, thereby removing material from each portion. In one embodiment, once the process is finished, both the plastic substrate and the thermoplastic overlayer share at least one common incision penetrating the thermoplastic overlayer and at least partially penetrating the plastic substrate.

Advantageously, this removal of material can result in channels, indentations, and crevices being defined in one or both of the thermoplastic overlayer and the plastic substrate. Components may be disposed within these channels, indentations, and crevices. Where the plastic substrate includes a housing interface surface that abuts the housing member, and the housing interface surface defines one or more concave geometric features, this removal of material allows the creation of mechanical features such as complex snaps without the use of undercuts. Where the plastic substrate comprises electrical components such as electrical conductors, antennas, nodes, and traces, this removal of material can allow for electrical connections to these devices, thereby allowing isolated antennas to be designed into electronic devices with extremely small form factors. Other advantages offered by embodiments of the disclosure will be obvious to those of ordinary skill in the art having the benefit of this disclosure.

Embodiments of the disclosure contemplate that it can be advantageous to construct housing and chassis components for portable electronic devices that have complex geometries, are made from different materials, and that support multiple components. Advantageously, embodiments of the disclosure provide a housing component that comprises an integration of multiple components. Each component can be manufactured from a different material. For example, an outer housing material can be manufactured from a metal, such as aluminum, while an interior chassis member is manufactured from plastic, and an embedded antenna is manufactured from copper.

In one or more embodiments, thanks to the post-molding processing that removes material from some or both of the thermoplastic overlayer and the plastic substrate allows each component to have differing and unique geometries. Further, complex snap and other features can be manufactured without the need for expensive tooling and undercut operations.

Embodiments of the disclosure understand that it is known to insert mold plastic about metal housing members. However, as noted above, embodiments of the disclosure contemplate that there is a demand for lighter and thinner devices, and thus thinner housings, without compromising mechanical protection and integrity. Embodiments of the disclosure contemplate that when very thin metal housings are subjected to an insert molding process, i.e., when thermoplastic material is molded into or about thin metal housings, such housings tend to warp and bend as the thermoplastic material cures from a liquid to a solid state.

Advantageously, to prevent such warping and bending, embodiments of the disclosure employ three different parts, as opposed to the two-part prior art system. While prior art insert molded housings only included insert molded plastic and the housing itself, in embodiments of the present disclosure a plastic substrate is first positioned along the housing prior to the insert molding process. The metal housing, which can be machined and/or formed prior to any processing, is coupled to a plastic substrate, which also can be machined and/or formed prior to processing. These two components are assembled and inserted into a mold. A thermoplastic overlayer is then applied atop the plastic substrate. In one or more embodiments, a post-machining process then removes some material from one or both of the thermoplastic overlayer and the plastic substrate.

The advantage of including the plastic substrate is that it prevents the thermoplastic overlayer from adhering to large parts of the metal housing. This lack of bonding between the hot thermoplastic material and the housing reduces warping and preserves the geometric integrity, i.e., flatness and/or predefined shapes, of the final assembly.

In one or more embodiments, the plastic substrate has geometric features that are designed, machined, and/or otherwise formed into its surfaces. Advantageously, when the post-machining process removes material through some portions of the plastic substrate along these geometric features, complex mechanical devices, such as snaps, clasps, hooks, and retainers, can be created that could otherwise not be machined into a prior art two-part design with only insert molded plastic and a housing. Moreover, where these geometric features are included, they can further help to reduce overall weight of the assembly.

Turning now to FIG. 1, illustrated therein is a housing member. For simplicity, the housing member will be referred to as a "housing." The housing 100 is shown in both perspective and sectional views in FIG. 1.

In one or more embodiments, the housing 100 can be a portion of a housing for a mechanical, electrical, or other device. For example, the housing 100 could be a rear housing for an electronic device, such as a mobile telephone, palmtop computer, laptop computer, tablet computer, gaming device, multimedia device, or other device. A front housing could be applied to complete the overall housing. Alternatively, the housing 100 could be just one portion of a multi-part housing.

In one or more embodiments, the housing 100 is manufactured from a rigid material. While the rigid material can be any of a number of materials, in one embodiment the housing is manufactured from aluminum. As noted above, embodiments of the disclosure advantageously help to prevent housings manufactured from softer metals, such as aluminum, from warping and bending after being subjected to an insert molding process. While aluminum is one suitable material for manufacture of the housing 100, others can be used as well. These include steel, carbon fiber, reinforced glass, plastic, polymers, and ceramics. Other materials suitable for manufacture of the housing 100 will be obvious to those of ordinary skill in the art having the benefit of this disclosure.

In this illustrative embodiment, the housing 100 includes a major face 101, a first minor face 102, a second minor face 103, a third minor face 104, and a fourth minor face 105. For ease of illustration, the housing 100 is shown as being substantially rectangular, with the first minor face 102, the second minor face 103, the third minor face 104, and the fourth minor face 105 extending substantially orthogonally from the major face 101. However, it should be understood that the housing 100 could take countless other shapes as well. For example, rather than being substantially planar, the major face 101 could be convex down or convex up. While shown as being substantially rectangular, the major face 101 could have a perimeter that is curved, contoured, or shaped. Similarly, the minor faces, regardless of number, may include curves and contours and may interface with the major face in accordance with a variety of geometric shapes. In short, the housing 100 can be shaped in nearly limitless geometric shapes and with numerous contours without departing from the spirit and scope of the disclosure.

Turning now to FIG. 2, a plastic substrate 200 has been disposed within the housing 100. In this illustrative embodiment, the plastic substrate 200 is disposed adjacent to the housing 100. As shown in FIG. 2, in one or more embodiments the plastic substrate 200 includes a face, which can be a major face or a minor face, which defines a housing interface 201. The housing interface 201 abuts an inner surface 202 of the housing 100.

In one or more embodiments, the plastic substrate 200 is be manufactured from a rigid thermoplastic, such as acrylonitrile butadiene styrene (ABS), polycarbonate (PC) and polycarbonate-ABS, and so forth. The substrate can be manufactured from other materials, including styrene, resins, rubber, or other pliant compounds. In one embodiment, polycarbonate is used for the plastic substrate 200 due to the fact that it easily bonds with thermoplastics used in insert and injection molding processes. However, other materials suitable for manufacturing the plastic substrate 200 will be obvious to those of ordinary skill in the art having the benefit of this disclosure.

As with the housing 100, the plastic substrate 200 is shown as a rectangular block for ease of illustration. However, as with the housing 100, the plastic substrate 200 can take any number of shapes or geometries, and can include any number of contours. Moreover, as will be shown in more detail with reference to FIG. 5 below, one or more concave or convex geometric features can be incorporated into major or minor surfaces of the plastic substrate 200 as well. The plastic substrate 200 can be constructed in nearly limitless geometric shapes and with numerous contours without departing from the spirit and scope of the disclosure.

In one embodiment, the plastic substrate 200 completely fills the interior 203 of the housing 100. In the illustrative embodiment of FIG. 2, the plastic substrate 200 only partially fills the interior 203 of the housing. Where the latter is the case, in one or more embodiments the position at which the plastic substrate 200 is disposed within the housing 100 can be maintained in a variety of ways.

Illustrating by example, in one embodiment, a layer of adhesive 204 is disposed between the housing interface 201 and the inner surface 202 of the housing 100. In another embodiment, the inner surface 202 of the housing 100 defines one or more mechanical features 205. The mechanical features 205 can include protrusions, bars, stops, retention devices, snaps, and other features. In one or more embodiments, the mechanical features 205 retain the plastic substrate 200 at a predetermined location 206 within the housing 100 during subsequent operations. For example, when the housing 100 and plastic substrate 200 are processed through an insert molding process, the mechanical features 205 retain the plastic substrate 200 at the predetermined location 206 within the housing 100 when the thermoplastic overlayer is insert molded into the housing 100 atop the plastic substrate 200. It should be noted that the layer of adhesive 204 and the mechanical features 205 can be used in combination or separately. Moreover, other techniques for retaining the plastic substrate 200 at the predetermined location 206 within the housing 100 will be obvious to those of ordinary skill in the art having the benefit of this disclosure.

Turning now to FIG. 3, once the plastic substrate 200 is disposed within the housing 100, the sub-assembly 300 can be put through an insert molding process 301. Insert molding is well known in the art. Essentially, in an insert molding process 301, a solid member, e.g., sub-assembly 300, is inserted into a mold cavity prior to the injection of molten plastic 302. When the molten plastic 302 is injected, the plastic flows about the solid piece, e.g., plastic substrate 200, thereby adhering to it and defining a thermoplastic overlayer 303 atop the plastic substrate 200. When the solid piece is also plastic, the solid piece melds with the molten plastic 302. In this case, the plastic substrate 200 molds with a thermoplastic overlayer 303 that is insert molded into the housing 100. The resultant part 304, which is confined by the walls of the housing 100 in this embodiment, is a metal housing having a solid member embedded therein.

In this illustrative embodiment, the plastic substrate 200 is disposed between the housing 100 and the thermoplastic overlayer 303. Also, in this illustrative embodiment the thermoplastic overlayer envelops surfaces, i.e., major and minor faces, of the plastic substrate 200 other than the housing interface 201, which is the surface of the plastic substrate 200 the inner surface 202 of the housing 100. In other embodiments, such as where the plastic substrate 200 completely fills the interior 203 of the housing 100, the thermoplastic overlayer 303 will only partially envelop the plastic substrate 200.

The molten plastic 302, and thus the resulting thermoplastic overlayer 303, can be of any of a number of materials. Illustrating by example, the molten plastic 302 comprises ABS, polycarbonate, or polycarbonate-ABS. In other embodiments, the molten plastic 302 comprises styrene, polystyrene, or other thermoplastics.

In one embodiment, the plastic substrate 200 and the thermoplastic overlayer 303 are manufactured from different materials. For example, the thermoplastic overlayer 303 can be polycarbonate-ABS while the plastic substrate 200 is polycarbonate. In one embodiment, the plastic substrate 200 is manufactured from a more rigid material than the thermoplastic overlayer 303. In another embodiment, the plastic substrate 200 is manufactured from a less rigid material than the thermoplastic overlayer 303.

In one embodiment, the plastic substrate 200 is manufactured from a more brittle material than the thermoplastic overlayer 303. In another embodiment, the plastic substrate 200 is manufactured from a less brittle material than the thermoplastic overlayer 303. In one embodiment, the plastic substrate 200 is manufactured from a more pliant material than the thermoplastic overlayer 303. In another embodiment, the plastic substrate 200 is manufactured from a less pliant material than the thermoplastic overlayer 303.

In one embodiment, the plastic substrate 200 is manufactured from a denser material than the thermoplastic overlayer 303. In another embodiment, the plastic substrate 200 is manufactured from a less dense material than the thermoplastic overlayer 303. In one embodiment, the plastic substrate 200 is manufactured from a heavier material than the thermoplastic overlayer 303. In another embodiment, the plastic substrate 200 is manufactured from a lighter material than the thermoplastic overlayer 303. Of course, in other embodiments, the same material can be used for the plastic substrate 200 and the thermoplastic overlayer 303.

In one embodiment, the plastic substrate 200 and the thermoplastic overlayer 303 can be manufactured in different colors. Having different colors for the plastic substrate 200 and the thermoplastic overlayer 303 can make post processing, machining, and assembly into a device simpler. For example, making the plastic substrate 200 and the thermoplastic overlayer 303 in different colors can create a mnemonic device indicating how much to process the sub-assembly 300, where to insert components into the sub-assembly 300, how to couple the sub-assembly 300 to other components, and so forth.

Figure 4:
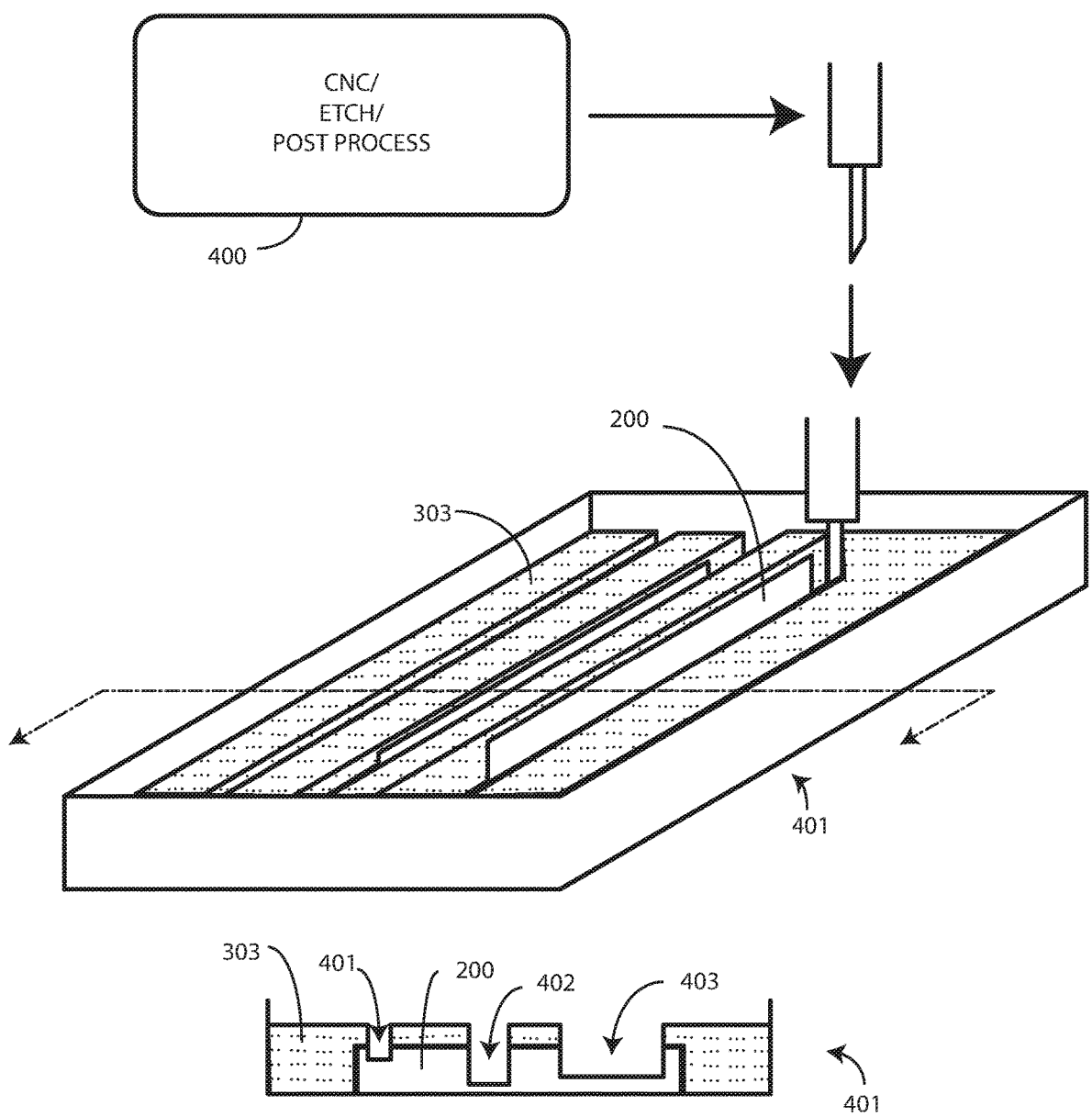
FIG. 4 illustrates one or more method steps for creating another housing assembly and a perspective and sectional view of another explanatory housing assembly in accordance with one or more embodiments of the disclosure.

Turning now to FIG. 4, once the thermoplastic overlayer 303 has been insert molded atop the plastic substrate 200, one or more post-processing operations 400 can be applied to the resulting component 401. In one or more embodiments, the one or more post-processing operations 400 comprise one or more of cutting, etching, making incisions, or otherwise removing at least a portion of the thermoplastic overlayer 303 and a portion of the plastic substrate 200. Illustrating by example, in one embodiment the post-processing operations 400 comprise performing a CNC cutting operation to cause one or more incisions 402,403,404 to be made into the thermoplastic overlayer 303 and at least a portion of the plastic substrate 200, thereby removing material from each portion. In one embodiment, once the post-processing operations 400 are finished, both the plastic substrate 200 and the thermoplastic overlayer 303 share at least one common incision, e.g., incision 403, penetrating the thermoplastic overlayer 303 and at least partially penetrating the plastic substrate 200.

Advantageously, this removal of material can result in channels, indentations, and crevices being defined in one or both of the thermoplastic overlayer 303 and the plastic substrate 200. Components, e.g., wires, conductors, antennas, battery cells, and so forth, may be disposed within these channels, indentations, and crevices. Other advantages offered by the channels, indentations, and crevices will be obvious to those of ordinary skill in the art having the benefit of this disclosure.

Figure 5:
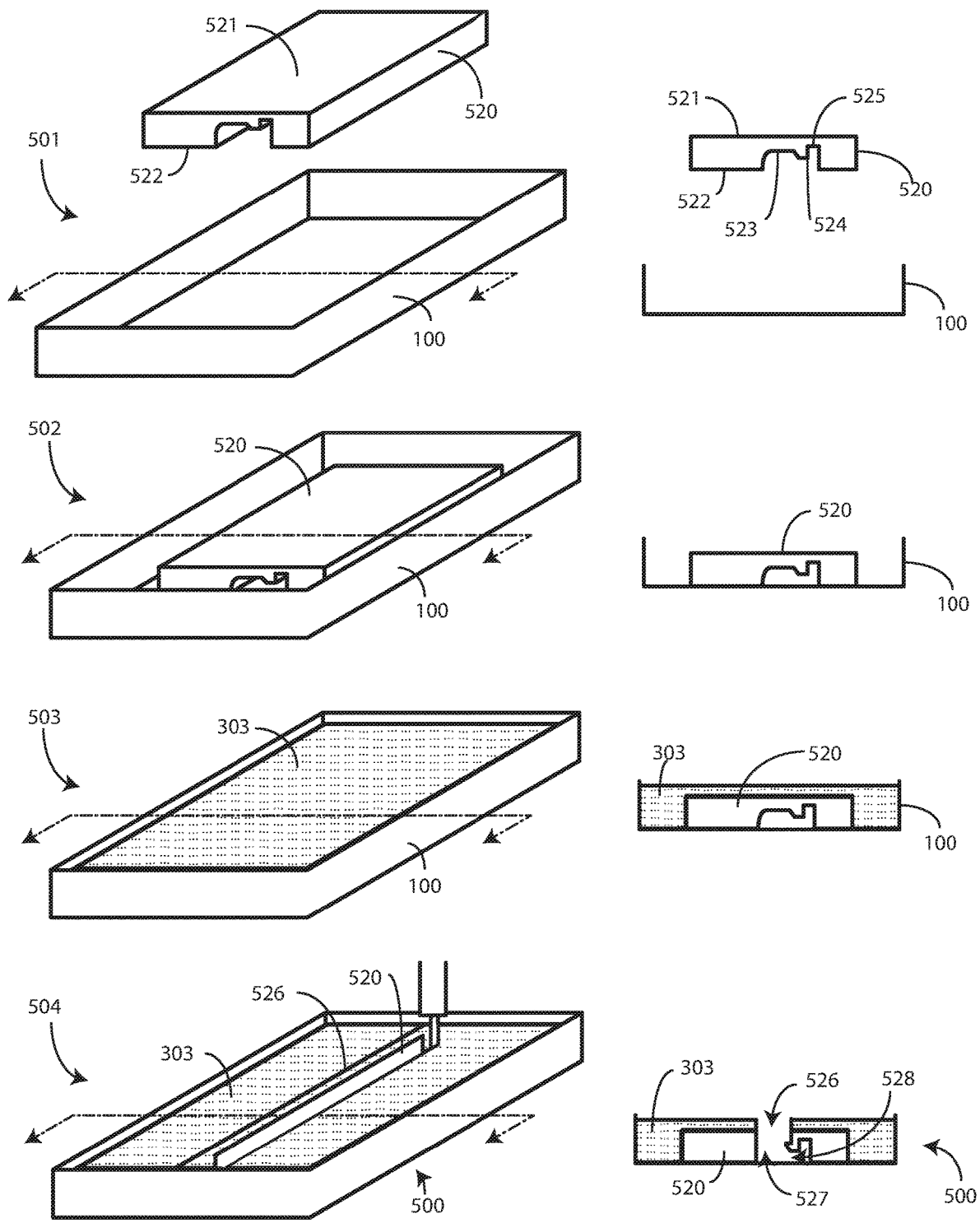
FIG. 5 illustrates one or more method steps for creating another housing assembly and a perspective and sectional view of another explanatory housing assembly in accordance with one or more embodiments of the disclosure.

Turning now to FIG. 5, illustrated therein are four steps 501,502,503,504 of a method of constructing a component 500 in accordance with one or more embodiments of the disclosure. At step 501, a plastic substrate 520 is disposed within a housing 100. As shown in this illustrative embodiment, the plastic substrate 520 includes a thermoplastic overlayer interface 521 and a housing interface 522. Also in this illustrative embodiment, the housing interface 522 defines one or more concave geometric features 523,524, 525. Note that while the one or more concave geometric features 523,524,525 protrude into, and out of the plastic substrate 520, they are all considered to be "concave" geometric features because they are formed by removing material from the plastic substrate 520, i.e., removing material beneath the surface defined by the housing interface 522.

As before, the plastic substrate 520 is disposed within, and adjacent to, the housing 100 at step 502. At step 503, a thermoplastic overlayer 303 is insert molded into the housing 100. As before, the plastic substrate 520 is disposed between the housing 100 and the thermoplastic overlayer 303, as shown at step 503.

At step 504, one or more post-processing operations are applied to the resulting component. In this illustrative embodiment, the post processing operations comprise making incisions 526 or otherwise removing at least a portion of the thermoplastic overlayer 303 and a portion of the plastic substrate 520.

In this illustrative embodiment, at least one incision 526 completely penetrates the plastic substrate 520 only along portions 527 of the one or more concave geometric features 523,524,525. In the embodiment of FIG. 5, completely penetrating the plastic substrate 520 at portion 527 allows the incision 526 and the one or more concave geometric features 523,524,525 to define a snap feature 528. Note that this snap feature 528, which is a complex mechanical feature, can be formed only with a linear down incision, and without the requirement of any undercut or other expensive (or impossible) machining operations. Advantageously, when the post-machining process removes material through the portion 527 of the plastic substrate 520 along these geometric features 523,524,525, complex mechanical devices, such as snaps, clasps, hooks, and retainers, can be created that could otherwise not be machined into a prior art two-part design with only insert molded plastic and a housing. Moreover, where these geometric features are included, they can further help to reduce overall weight of the component 500. While a snap feature 528 is one form of mechanical feature that can be formed by removing material through the portion 527 of the plastic substrate 520 along these geometric features 523,524,525, numerous others will be obvious to those of ordinary skill in the art having the benefit of this disclosure.

Figure 6:
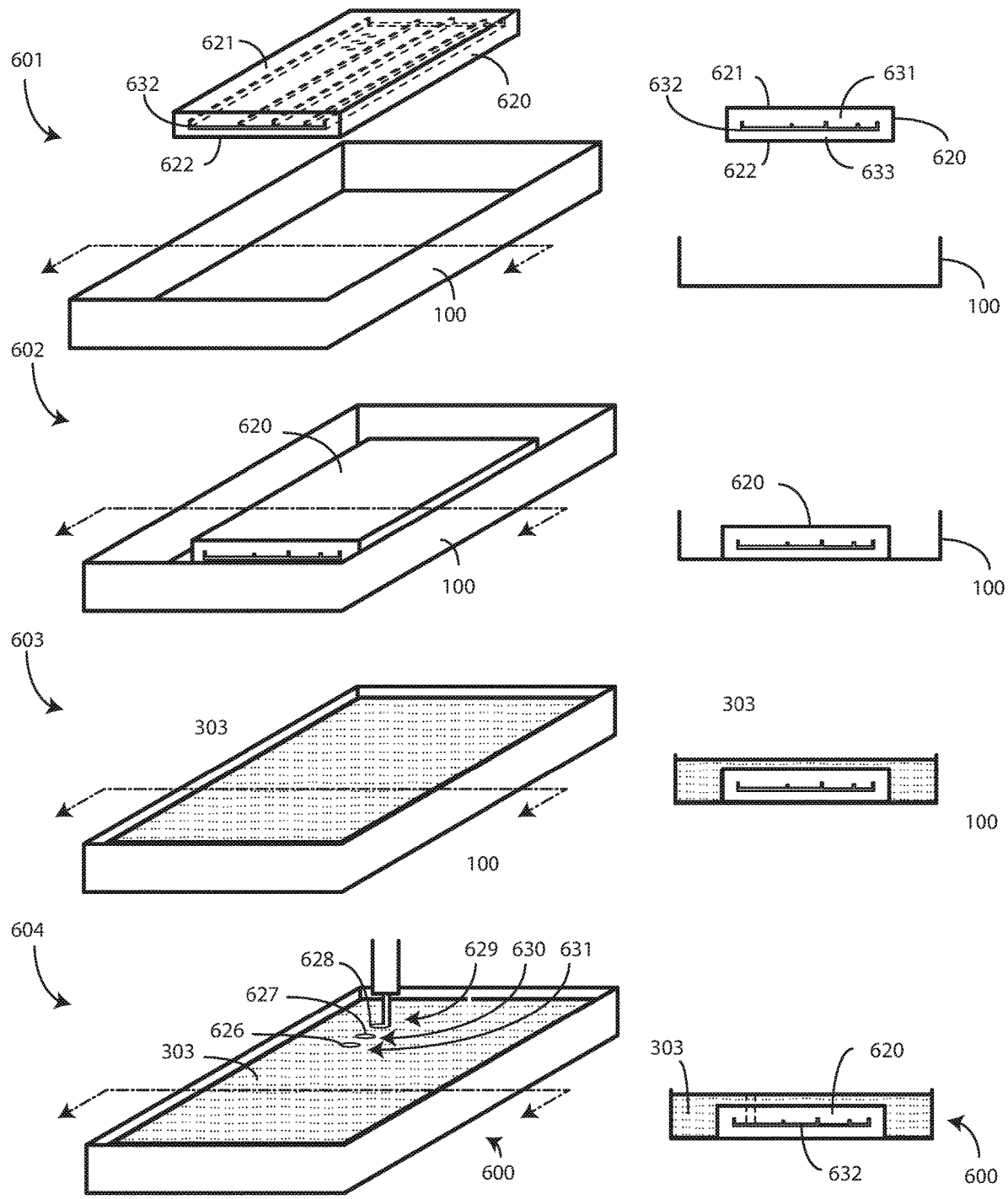
FIG. 6 illustrates one or more method steps for creating another housing assembly and a perspective and sectional view of another explanatory housing assembly in accordance with one or more embodiments of the disclosure.

Turning now to FIG. 6, illustrated therein are four steps 601,602,603,604 of a method of constructing a component 600 in accordance with one or more embodiments of the disclosure. At step 601, a plastic substrate 620 is disposed within a housing 100. As shown in this illustrative embodiment, the plastic substrate 620 includes a thermoplastic overlayer interface 621 and a housing interface 622. Also in this illustrative embodiment, electrically conductive material 632 is disposed within the plastic substrate 620. The electrically conductive material 632 can be any of a number of materials, examples of which include copper, aluminum, gold, or nickel. Other materials will be obvious to those of ordinary skill in the art having the benefit of this disclosure.

In this illustrative embodiment, the electrically conductive material 632 defines an antenna. However, the electrically conductive material 632 can define other components as well. For example, in another embodiment the electrically conductive material 632 defines conductive traces to couple power and signals between electrical components. In another embodiment, the electrically conductive material 632 is resistive and comprises a warming device to warm the component 600. Other uses for the electrically conductive material 632 will be obvious to those of ordinary skill in the art having the benefit of this disclosure.

The electrically conductive material 632 can be integrated into the plastic substrate 620 in a number of ways. For example, in one embodiment the electrically conductive material 632 is insert molded into the plastic substrate 620. In another embodiment, the plastic substrate 620 comprises a first half 631 and a second half 633 which are joined together about the electrically conductive material 632. Other manufacturing techniques for integrating the electrically conductive material 632 into the plastic substrate 620 will be obvious to those of ordinary skill in the art having the benefit of this disclosure.

As before, the plastic substrate 620 is disposed within, and adjacent to, the housing 100 at step 602. At step 603, a thermoplastic overlayer 303 is insert molded into the housing 100. As before, the plastic substrate 620 is disposed between the housing 100 and the thermoplastic overlayer 303, as shown at step 603.

At step 604, one or more post-processing operations are applied to the resulting component 600. In this illustrative embodiment, the post processing operations comprise making incisions 626,627,628 or otherwise removing at least a portion of the thermoplastic overlayer 303 and a portion of the plastic substrate 520.

In this illustrative embodiment, the incisions 626,627,628 completely penetrate the thermoplastic overlayer 303 and partially penetrate the plastic substrate 620. In this embodiment, the incisions 626,627,628 penetrate just enough of the plastic substrate 620 to expose one or more portions of the electrically conductive material 632. Where the electrically conductive material 632 defines an antenna, this results in the thermoplastic overlayer 303 and the plastic substrate 620 each defining one or more apertures 629,630,631 exposing portions of the antenna. Electrical connections to the antenna can be made through these apertures 629,630,631.

Figure 7:
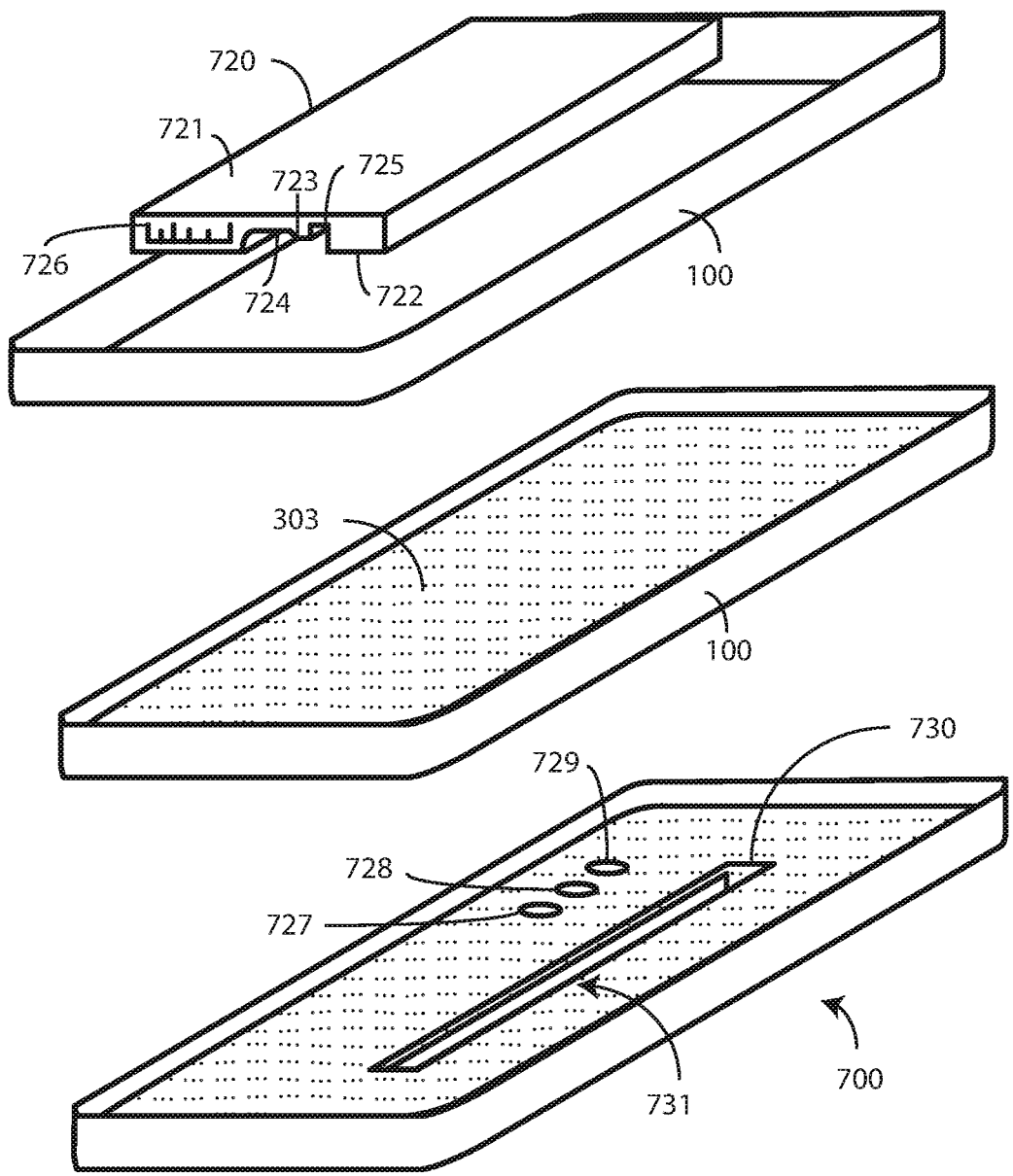
FIG. 7 illustrates one or more method steps for creating another housing assembly and a perspective and sectional view of another explanatory housing assembly in accordance with one or more embodiments of the disclosure.

Turning now to FIG. 7, illustrated therein is yet another plastic substrate 720 being inserted into a housing 100. The plastic substrate 720 includes a thermoplastic overlayer interface 721 and a housing interface 722. The housing interface defines one or more concave geometric features 723,724,725. Additionally, the plastic substrate 720 includes an integrated antenna 726.

The plastic substrate 720 is disposed within, and adjacent to, the housing 100. A thermoplastic overlayer 303 is insert molded into the housing 100. One or more post-processing operations are applied to the resulting component 700. In this illustrative embodiment, the post processing operations comprise making incisions 727,728,729,730 removing at least a portion of the thermoplastic overlayer 303 and a portion of the plastic substrate 720.

In the illustrative embodiment of FIG. 7, the incisions 727,728,729,730 have two functions. First, incisions 727, 728,729 expose the antenna 726, thereby permitting electrical connections thereto. Second, the incision 730 defines a snap feature 731 as previously described above with reference to FIG. 5. The resulting component 700 can now be used as a housing member for an electronic device.

Figure 8:
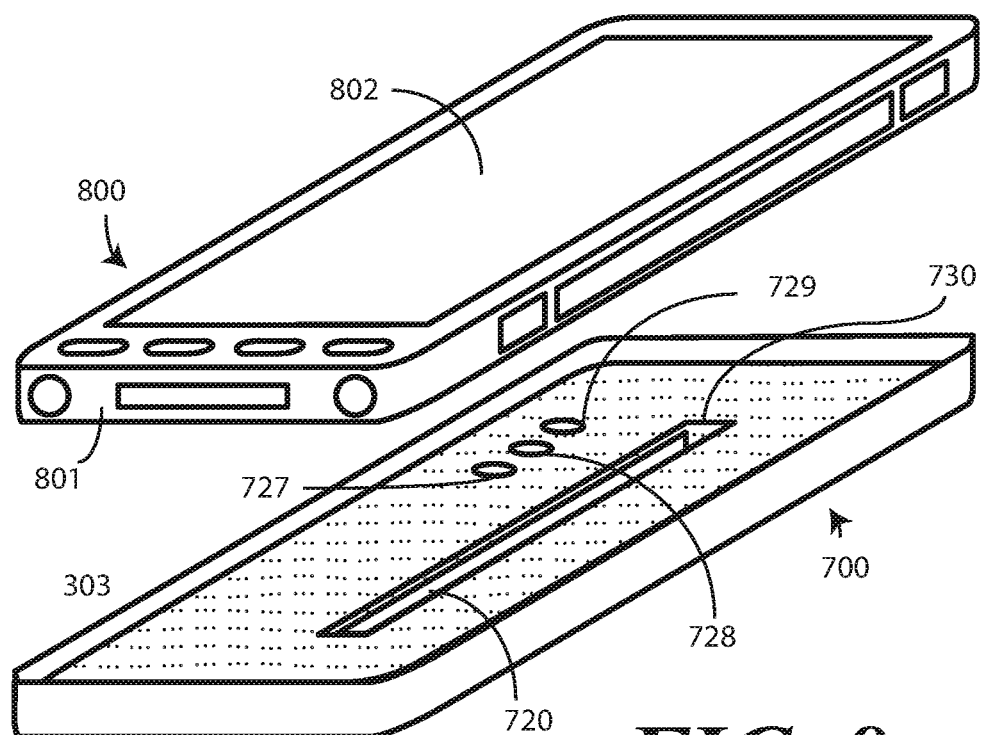
FIG. 8 illustrates one explanatory electronic device, shown in exploded view, employing an explanatory housing assembly in accordance with one or more embodiments of the disclosure.
Figure 9:
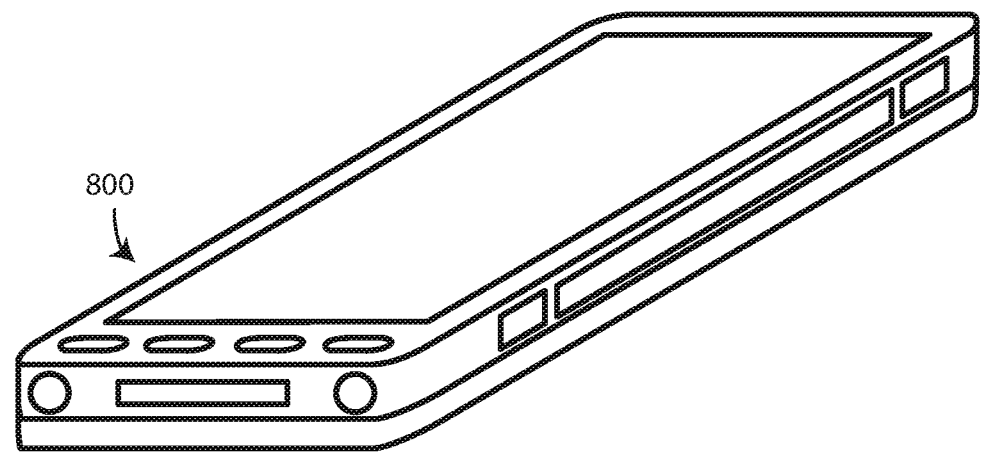
FIG. 9 illustrates one explanatory electronic device employing an explanatory housing assembly in accordance with one or more embodiments of the disclosure.

Turning now to FIGS. 8-9, illustrated therein is an electronic device 800 comprising a first housing 801 and a second housing. In this illustrative embodiment, the second housing is the component 700 from FIG. 7. The electronic device 800 of FIG. 8 is shown as a portable electronic device for illustrative purposes. The electronic device 800 of FIG. 8 is shown illustratively as a smartphone as an illustrative example. However, the electronic device 800 can take other forms as well, including as a palm top computer, a gaming device, a laptop computer, a multimedia player, and so forth. Still other examples of electronic devices will be obvious to those of ordinary skill in the art having the benefit of this disclosure.

In one or more embodiments, the housing of the electronic device is defined by the first housing 801 and the component 700. In this illustrative embodiment, the first housing 801 is disposed about the periphery of a display 802, thereby defining a major face of the electronic device 800. The electronic device 800 can include one or more processors operable with the display 802 and other components of the electronic device 800. The one or more processors can be configured to process and execute executable software code to perform the various functions of the electronic device 800.

The display 802 may optionally be touch-sensitive. In one embodiment where the display 802 is touch-sensitive, the display 802 can serve as a primary user interface of the electronic device 800. Users can deliver user input to the display 802 of such an embodiment by delivering touch input from a finger, stylus, or other objects disposed proximately with the display. In one embodiment, the display 802 is configured as an organic light emitting diode (OLED) display. However, it should be noted that other types of displays would be obvious to those of ordinary skill in the art having the benefit of this disclosure.

A communication circuit can be included with the electronic device 800. The communication circuit can be configured for wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit can include wireless communication circuitry, one of a receiver, a transmitter, or transceiver. The communication circuit can be operable with the antenna (726) disposed within the plastic substrate (720) of the component 700 in one or more embodiments. Electrical contacts from the receiver, transmitter, or transceiver can extend through the incisions 727,728,729 that expose the antenna (726). Incisions 727,728,729 each define common incisions penetrating the thermoplastic overlayer 303 and at least partially penetrating the plastic substrate (720), thereby exposing the antenna (726).

In this illustrative embodiment, incision 730 penetrates the thermoplastic overlayer 303 and completely penetrates the plastic substrate 720. In one or more embodiments, components in the first housing 801 can include mechanical features, e.g., a snap insert, to insert into the mechanical features defined by incision 730 to couple the first housing 801 to the component 700. Additionally, terminals extending from electrical components within the first housing 801 can extend through the incisions 727,728,729 that expose the antenna (726) to couple those terminals to the antenna (726) when the first housing 801 is coupled to the component 700. Turning to FIG. 9, the electronic device 800 is shown with the first housing 801 coupled to the component 700.

Embodiments of the disclosure contemplate that metal housings, such as the aluminum housings of the first housing 801 and the component 700 define a major trend in portable electronic device markets. Moreover, the plastic substrate (720) of FIGS. 8-9 offers a solution wherein the antenna, (726) is embedded into the plastic substrate (720) for isolation. However, prior art techniques cause the outer metal housings to warp, shrink, and bend, thereby causing these housings to warp and bend. Such housings cannot simply be "made thinker" because doing so limits available space in the housing design, along with tending to make a product heavier. Advantageously, to minimize "warpage" and to ensure consistency with the desired shape, embodiments of the disclosure insert mold a thermoplastic overlayer (303) atop the plastic substrate (720).

By inserting the plastic substrate (720) into the housing prior to insert molding the thermoplastic overlayer (303) atop the plastic substrate (720), this results in reduced warpage and retention of shape due to the fact that contact between molten plastic an a thin, e.g., aluminum, housing is reduced in area. Moreover, a large-sized plastic substrate (720) can be used as internal feature as it is machined cut after molding. This results in a reduced product weight. Additionally, it provides more flexible design options when designing new products.

It is to be understood that FIGS. 8-9 are provided for illustrative purposes only and for illustrating components of one electronic device 800 in accordance with embodiments of the disclosure, and is not intended to be a complete schematic diagram of the various components required for an electronic device. Therefore, other electronic devices in accordance with embodiments of the disclosure may include various other components not shown in FIGS. 7-8, or may include a combination of two or more components or a division of a particular component into two or more separate components, and still be within the scope of the present disclosure.

Figure 10:
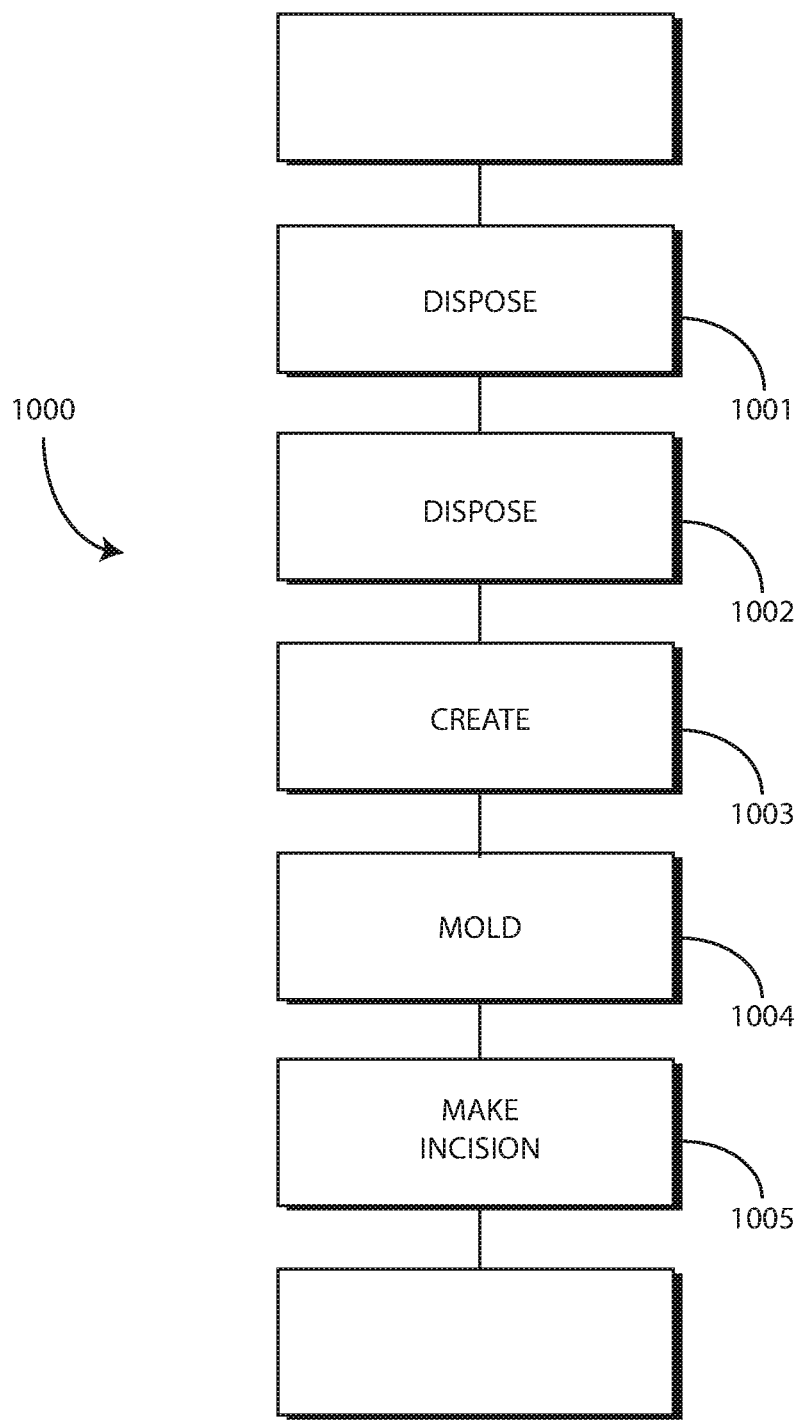
FIG. 10 illustrates one explanatory method in accordance with one or more embodiments of the disclosure.

Turning now to FIG. 10, illustrated therein is one explanatory method 1000 in accordance with one or more embodiments of the disclosure. As shown in FIG. 10, the method 1000 includes at step 1001 disposing a plastic substrate at a predefined location within a housing. In one embodiment, optional step 1002 includes disposing one or more electrical conductors in the plastic substrate prior to the insert molding At step 1003, the method 1000 optionally includes creating one or more concave features in an interface surface of the plastic substrate abutting the housing.

At step 1004, the method 1000 includes insert molding a thermoplastic overlayer atop the plastic substrate. At step 1005, the method 1000 includes making at least one incision penetrating the thermoplastic overlayer and at least partially penetrating the plastic substrate. In one embodiment, where optional step 1003 is included, step 1005 includes the at least one incision completely penetrating the plastic substrate at one or more portions of the one or more concave features.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A component for an electronic device, the component comprising:
   a housing;
   a plastic substrate, disposed adjacent to the housing; and
   a thermoplastic overlayer, insert molded into the housing;
   wherein the plastic substrate is disposed between the housing and the thermoplastic overlayer;
   wherein the thermoplastic overlayer envelops all major and minor faces of the plastic substrate other than a housing interface of the plastic substrate, which is a major face of the plastic substrate abutting the housing.

2. The component of claim 1, further comprising an adhesive layer disposed between the plastic substrate and the housing.

3. The component of claim 1, the housing defining one or more mechanical features retaining the plastic substrate at a predetermined location within the housing.

4. The component of claim 1, wherein the plastic substrate and the thermoplastic overlayer are manufactured from different materials.

5. The component of claim 4, wherein the housing is manufactured from aluminum.

6. The component of claim 1, further comprising electrically conductive material disposed within the plastic substrate.

7. The component of claim 6, wherein the electrically conductive material defines an antenna.

8. The component of claim 7, wherein the antenna is electrically isolated from electrical connections to any of a receiver, transmitter, or transceiver.

9. The component of claim 6, wherein the electrically conductive material comprises a resistive material.

10. The component of claim 6, wherein the plastic substrate comprises a first half and a second half which are joined together about the electrically conductive material.

11. The component of claim 6, wherein the electrically conductive material is insert molded into the plastic substrate.

12. The component of claim 1, the housing defining another major face, a first minor face, a second minor face, a third minor face, and a fourth minor face.

13. The component of claim 12, the first minor face, the second minor face, the third minor face, and the fourth minor face extending orthogonally from the another major face.

14. The component of claim 12, the thermoplastic overlayer abutting each of the first minor face, the second minor face, the third minor face, and the fourth minor face.

15. The component of claim 14, the first minor face, the second minor face, the third minor face, and the fourth minor face extending from the another major face beyond a height that the thermoplastic overlayer extends from the another major face.

16. The component of claim 1, wherein the plastic substrate and the thermoplastic overlayer are manufactured in different colors.

* * * * *